April 10, 1934. C. E. WILLIAMS ET AL 1,954,552
BASIC REFRACTORY AND METHOD OF MAKING THE SAME
Filed July 29, 1932 2 Sheets-Sheet 1
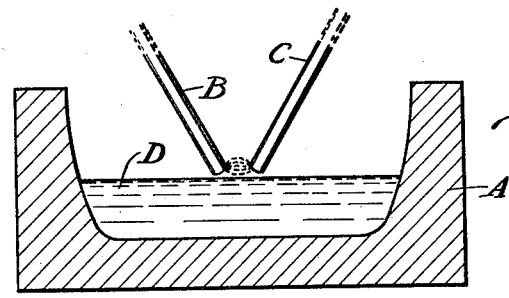
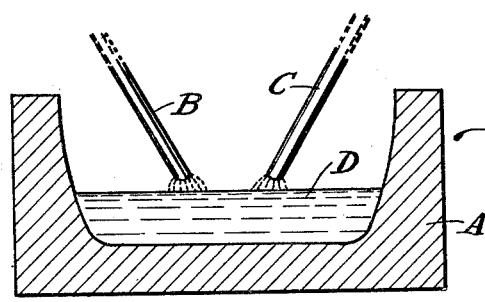
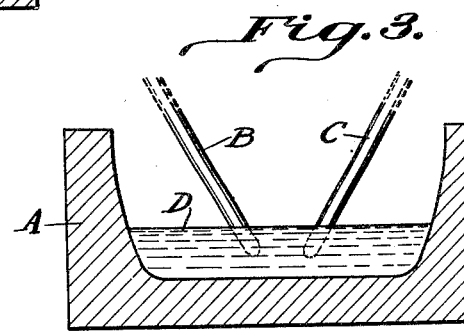
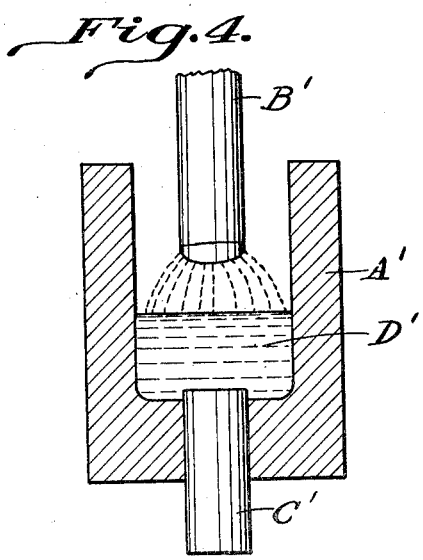
Inventors
C. E. Williams
J. D. Sullivan
W. S. McDowell
Attorney April 10, 1934.    C. E. WILLIAMS ET AL    1,954,552
BASIC REFRACTORY AND METHOD OF MAKING THE SAME
Filed July 29, 1932    2 Sheets-Sheet 2

Inventors
C. E. Williams
J. D. Sullivan

W. S. M. Howell
Attorney

Patented Apr. 10, 1934

1,954,552

UNITED STATES PATENT OFFICE 1,954,552

BASIC REFRACTORY AND METHOD OF MAKING THE SAME

Clyde E. Williams and John D. Sullivan, Columbus, Ohio, assignors to Battelle Memorial Institute, Columbus, Ohio, a corporation of Ohio Application July 29, 1932, Serial No. 626,169

26 Claims. (Cl. 49—79)

This invention relates to basic refractory materials and particularly to those that will withstand the corrosive action of slags, glasses, or other molten materials at elevated temperatures.

Our invention also provides a new refractory material made by melting raw refractory oxides. It also provides for casting the molten mass composed of such refractory oxides into desired shapes and allowing it to solidify by cooling.

This invention further relates to the manufacture of refractory bricks, furnace linings and bottoms, and other articles from our new refractory material by breaking the solidified mass into small fragments and incorporating into desired shapes by tamping, or by the use of suitable binders.

It is a further object to provide a method for manufacturing this new refractory material.

To make clear the importance of this new refractory material and its relation to and difference from other refractory materials now in use, the following discussion is given. Glasses, slags, and other corrosive molten material attack the refractory containers in which they are melted. In general, the higher the melting point of the refractory, the less is the action of the molten corrosive liquid. Basic slags attack acidic refractories more vigorously than basic refractories. In the metallurgical industry, many slags are basic in character. Silica and fire bricks, refractories in common use, are not only acidic in nature, but also melt at temperatures considerably below those required for melting certain materials. Refractories of the "Mullite" type withstand corrosion somewhat better than silica or fire brick, but they, too, are attacked at temperatures below those required for certain types of melting. Properties of many glasses and ceramic products are improved by heating considerably above the melting point, but present refractories generally will not permit the required temperature. A refractory of high melting point will remain longer in service and is, therefore, an improvement in the art of metallurgy. One of the most common and desirable basic refractories is magnesium oxide. By heating this material to a temperature of about 1450° C., or higher, the mineral periclase is formed which is denser and more refractory than less highly heated magnesium oxide. Periclase does not slake in air like the material fired at a lower temperature. To secure maximum effects from heating, magnesium oxide is melted. This oxide melts at about 2800° C. and temperatures of this order can be obtained commercially only in an electric furnace. At temperatures considerably below 2800° C., magnesium oxide reacts with carbon to form metallic magnesium which is volatilized.

The ordinary refractory brick in which the particles are held together by a bond often fail by failure of the bond. That is, the bond either melts or loses its strength at too low a temperature, is attacked by slag or vapors to which it is exposed, allows penetration of vapors or slags which cause failure, etc. Hence, bricks or blocks cast from molten refractory material have no artificial or extraneous bond and are dense and completely nonpermeable. No basic refractory made by casting fused material has heretofore been made. Our invention is, therefore, directed to the preparation of such a fused and cast basic refractory. Magnesium oxide has been melted and the cooled mass has been crushed for use as grog in brick and cements, but so far as we are aware, has never been cast into bricks or blocks and used in this form, owing to the high melting temperature and the gassy nature of the melt.

Use of another basic refractory of lower melting point than magnesium oxide, but still of high enough melting point to possess satisfactory refractory properties, is desirable. We have discovered such a refractory material and a method for preparing it.

Barium monoxide melts at about 1975° C. and is strongly basic in its properties. We have discovered that barium monoxide may be melted and that the molten material may be cast into desired shapes.

We have further discovered that mixtures of barium monoxide and magnesium oxides or of barium oxide, magnesium oxide, and calcium oxide may be melted together and satisfactorily cast into bricks and a very refractory product obtained. Mixtures of barium monoxide and magnesium oxide melt at temperatures below the melting point of magnesium oxide, and mixtures of barium monoxide and magnesium and calcium oxides melt at lower temperatures than mixtures of magnesium and calcium oxides. We have discovered that either barium monoxide alone, or mixtures of barium oxide with either or both of the oxides comprising magnesium oxide and calcium oxide may be melted and cast into desired shapes, such as bricks, tubes, plates and other refractory articles. We prefer, however, in the case of these mixtures to have 5% or more of barium oxide, since barium monoxide lowers the melting point.

Although pure oxides can be used and are even desirable since the melting points are high and the resulting product has excellent refractory properties, oxides of ordinary commercial purity are satisfactory. The usual amounts of impurities as silica, alumina, iron, and lime found in many commercial grades of magnesium oxide, magnesite, calcium oxide, limestone, dolomite and barium monoxide can be tolerated in making the refractory product.

As raw materials commercial grades of calcined magnesite, $MgCO_3$, or calcined dolomite $CaMg(CO_3)_2$, and calcined witherite, $BaCO_3$, may be used. We do not, however, limit our invention to the use of these materials. Any mineral or compound of barium and magnesium and calcium which by calcination will yield the respective oxides may be used. As part of our invention, we may heat barium and magnesium carbonates or these and calcium or calcium and magnesium carbonates, to remove carbon dioxide and to melt the resulting oxides.

We have discovered that suitable mixtures of barium and magnesium oxides or of barium, magnesium and calcium oxides may be melted and then cast into desired shapes. The refractory may be cast in various types of molds well known to the ceramic and metallurgical arts.

Our refractory can be used in the cast state or also as a ramming mixture or cement, as in furnace linings or bottoms. The refractory, after being pulverized, can be rammed into place, using a suitable binder. As an example, an organic binder which can later be burned out may be used. Likewise, bricks of various shapes and sizes may be made of the ground pulverized material, using either organic or inorganic binders to keep the material together until it is fired at high enough temperature to hold it together by its own strength.

Fused masses of barium monoxide and magnesium oxide do not slake in air and mixtures containing 35% or less of barium monoxide do not slake or disintegrate even after remaining under water for several weeks.

A special feature of this refractory is that it is crystalline in character and can be cooled rapidly. Slow cooling or annealing, which is essential in the manufacture of the mullite type of refractories, is not necessary.

While our refractory may be melted and tapped or poured, tapping or pouring is not essential to our invention. While tapping or pouring to cast the material into shapes is desirable and is a particular feature of our invention, for some purposes it may be desirable to melt the refractory oxides and to permit them to cool and solidify in the furnace in which they were melted. It is to be understood that our invention covers this phase.

We have discovered that this refractory can be made by melting raw oxides in an electric furnace. Three types of furnaces are especially suitable, but we do not limit our invention to these types only.

A more complete understanding of our invention may be obtained by reference to the accompanying drawings, disclosing several types of furnaces practicable in carrying the invention into effect.

Figs. 1, 2 and 3 are vertical cross sectional views illustrating an electric furnace operating on the batch principle for producing our improved refractory. In this type of furnace, both electrodes are movable with respect to each other and with respect to the molten bath in the furnace.

Figs. 4 and 5 are similar diagrammatic views of a second type of furnace wherein a fixed electrode and a movable electrode are employed.

Referring more particularly to the drawings, the first type of furnace is shown diagrammatically in Figs. 1, 2 and 3. These are cross-sectional views of the melting furnace. In these figures, A is a chamber lined with refractory material. B and C are two electrodes which are both movable in horizontal and vertical directions and are connected to a source of electrical supply. For our purpose, we prefer to use alternating current. D represents the refractory oxides being melted. It will be understood that the furnaces are equipped with tapping holes or with devices for pouring. These are not shown in the figures, since the diagrams are for the purpose of illustrating the method of melting the refractory.

The furnace disclosed in Figs. 1, 2 and 3 may be used to illustrate batch type of melting. In Fig. 1, the refractory oxides D are cold and solid. An arc is struck between the electrodes B and C and the heat from the arc heats the oxides and some melting takes place. As the mass becomes hotter, the electrodes may be drawn farther apart, as illustrated in Fig. 2, in which the arc is shown as taking place between the electrodes and the bath. As more of the oxides D melt, the electrodes may be lowered and dipped into the molten mass, as illustrated in Fig. 3. In this condition, some or all of the melting may take place by virtue of the resistance of the molten bath to the passage of electric current. It will be understood that these illustrations are not to be construed to mean that the refractory can be melted only in batch lots. This type of furnace may be used continuously, tapping or pouring molten material at various intervals and adding more raw materials. In fact, one of the features of our process is that barium monoxide and magnesium oxide may be melted together and additional mixed oxides or the more refractory magnesium oxide alone added to the molten bath. Also, we may melt a mixture high in the lower temperature melting oxide, barium monoxide, and add thereto magnesium oxide and so produce a refractory high in magnesium oxide without undue loss of magnesium oxide by reduction and vaporization, which has been the experience of those in the past who have attempted to melt magnesium oxide in the electric furnace.

Figure 5:
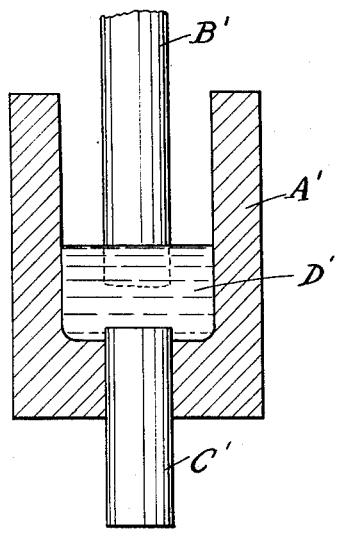

The second type of electric furnace suitable for making our refractory is illustrated diagrammatically in Figs. 4 and 5. These figures show cross-sectional views of the melting furnace. A' is a chamber lined with refractory material. B' and C' are two electrodes; the upper one B' is movable and the bottom one C' is fixed and forms part of the furnace bottom. As a modification, C' may be the entire furnace bottom. Electrodes B' and C' are connected to a source of electrical supply, alternating current being preferred. D' represents the refractory oxides undergoing melting in the furnace and in Fig. 4 there is illustrated the arc method of melting. If batch melting is employed and oxides D' are cold and solid, the arc may be started by having a pencil carbon or pieces of granular carbon extending from the top of electrode C' to the top of D'. The electrode B' is lowered until contact is made and then moved upward, forming an arc between B' and D'. If continuous melting is employed, the arc is struck by bringing B' in close proximity to D', which is hot and partly or wholly molten. As more solid material is added and melted, B' is raised. When molten material is tapped, B' is lowered, and as more solid is added and melted, B' is again raised.

This same type of furnace can be used to melt by virtue of the resistance of molten or partly molten bath D', to passage of electric current, as illustrated in Fig. 5. Electrode B' is lowered below the surface of D' and current passes through the bath to the lower electrode C'. Some arcing may also take place between the bath and that part of the electrode just protruding from the bath. The furnace illustrated in Figs. 4 and 5 is suitable for continuous melting since as more solid material is added and melted, electrode B' may be moved upward. When molten material is tapped or poured, the upper electrode is likewise lowered. A combination of arc and resistance melting, as illustrated in Figs. 4 and 5, is suitable for making our refractory.

Figure 6:
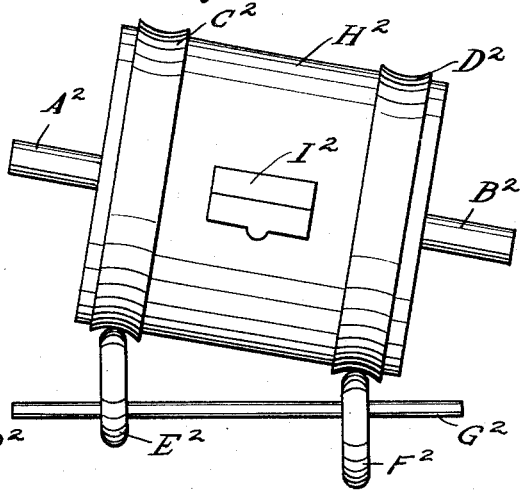
Figs. 6 and 7 illustrate the rocking type of electric furnace, Fig. 6 being a side elevation of such a furnace and Fig. 7 a vertical sectional view through the melting chamber thereof.

The rocking type of electric furnace is suitable for melting our refractory and Fig. 6 represents a side elevation of such a furnace. A2 and B2 are electrodes connected to a suitable source of electric supply. H2 is the furnace chamber which consists of a metal shell inside of which is a refractory lining. C2 and D2 are tires mounted to the shell of furnace H2. E2 and F2 are eccentric trunnions mounted on shaft G2 which is connected to a suitable source of mechanical power. The shaft G2 turns and gives a rocking motion to the furnace. The shaft G2 rotates through a certain angle and then rotation is reversed in the opposite direction through a certain angle. Suitable auxiliary mechanical devices are attached to the shaft G2 to give the desired rotatory motion. I2 is a door through which solid material is charged and molten material is poured. The operation of a rotating furnace is so well-known to the ceramic and metallurgical industry that further details of operation are considered unnecessary here. We do not, of course, limit our invention to the use of this particular type of rocking furnace. As a modification, trunnions E2 and F2 may be truly centered on shaft G2 and the rocking motion produced by having the tires C2 and D2 eccentric to the shell of the furnace.

Figure 7:
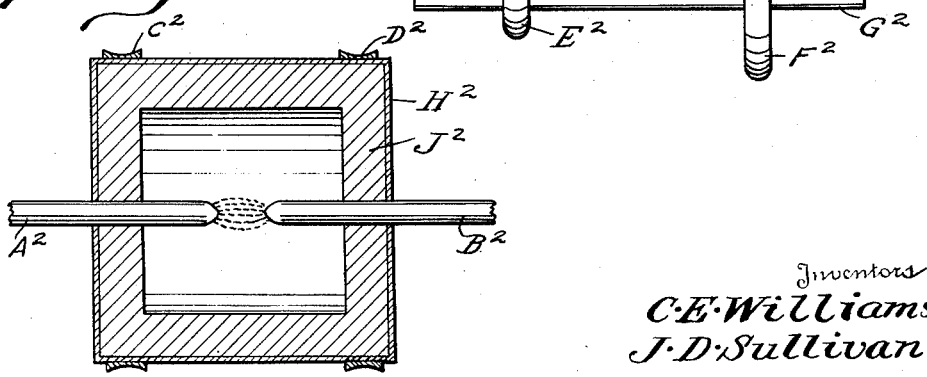

In Fig. 7, there is illustrated a cross-sectional view of the melting chamber of the furnace illustrated in Fig. 6. H2 is the metallic shell, J2 is the refractory lining, and A2 and B2 are electrodes connected to a suitable source of electric supply. The electrodes are movable and the arc is struck by bringing A2 and B2 together and then drawing them apart. Heat from the arc melts the solid refractory oxides in the furnace chamber and the molten material is poured from the furnace.

It will be appreciated that the invention may be incorporated in other types of electric furnaces and that various changes may be made in the process from the specific examples above set forth without departing from the features and spirit of the invention as the latter has been defined in the following claims.

What is claimed is:

1. A basic refractory material composed of barium monoxide and magnesium oxide.

2. The method for producing a basic refractory, which consists in the step of melting together barium monoxide and magnesium oxide.

3. The method for producing a basic refractory which consists in melting barium monoxide.

4. A basic refractory material, comprising the solidified product of a molten mass of barium monoxide and magnesium oxide.

5. The method for producing a refractory material which consists in calcining a salt of barium and a salt of magnesium to form oxides, and melting the resultant oxides.

6. The method for producing a refractory material which consists in calcining a salt of barium and a salt of magnesium to form oxides, and melting the resultant oxides in an electric furnace.

7. The method for producing a basic refractory material which consists in melting barium monoxide, adding thereto magnesium oxide and melting the same, whereby to minimize loss of magnesium oxide through volatilization.

8. The method for producing a basic refractory material which consists in melting a mixture of barium monoxide and magnesium oxide high in barium monoxide and adding thereto magnesium oxide and melting the same, whereby to minimize the loss of magnesium oxide by volatilization.

9. As a new product of manufacture, a cast basic refractory material of crystalline structure and predetermined shape comprising barium monoxide and magnesium oxide.

10. The method of producing a refractory material which consists in melting together barium monoxide and magnesium oxide and cooling the molten mass to solidifying and then to room temperatures without annealing.

11. The method for producing a refractory material which consists in melting together barium monoxide and magnesium oxide, and cooling the molten mass to solidify, and annealing the same.

12. As a new article of manufacture, a refractory brick composed of a fused mixture of barium monoxide and magnesium oxide.

13. As a new article of manufacture, a basic refractory product composed of barium oxide, magnesium oxide and calcium oxide.

14. The method for producing a basic refractory which consists in melting barium monoxide with magnesium oxide and calcium oxide.

15. A basic refractory material comprising the solidified product of a molten mass of barium monoxide, magnesium oxide and calcium oxide.

16. A basic refractory material comprising the cooled and solidified product of commercial barium monoxide, calcined magnesite, and calcined dolomite.

17. A basic refractory material comprising the cooled and solidified product of commercial barium monoxide, calcined magnesite, calcined dolomite and lime.

18. The method of producing a basic refractory material which consists in melting together under high temperatures a mixture composed of commercial barium monoxide, commercial calcined magnesite, calcined dolomite and lime.

19. The method for producing a fused refractory material, the step which consists in melting together commercial calcined barium carbonate, commercial calcined magnesium carbonate and calcined dolomite.

20. The method for producing a fused refractory material which consists in melting together calcined barium carbonate and calcined dolomite.

21. The method of producing a refractory material which consists in melting together barium monoxide, magnesium oxide, and lime, and cooling the molten mass to solidify.

22. The method of producing a refractory material which consists in melting together barium carbonate and magnesium oxide and cooling the molten mass to solidify.

23. The method of producing a refractory material which consists of melting together barium carbonate, magnesium oxide, and lime and cooling the molten mass to solidify.

24. The method of producing a refractory material which comprises melting together barium monoxide, at least one of the oxides of the group consisting of magnesium oxide and calcium oxide, there being at least 5% of barium oxide in the charge.

25. The method of producing a basic refractory wherein magnesium oxide is the chief constituent which comprises melting at least one of the oxides of the group consisting of barium oxide and calcium oxide with the magnesium oxide to lower the melting and solidification points and render it sufficiently fluid for casting and then casting into a mold of predetermined size and shape and permitting it to solidify and assume the shape of the mold.

26. The method of producing a basic refractory which comprises melting together magnesium oxide and barium oxide and then while the mass is in a flowing state, forming it into a body of desired shape and proportion and allowing the same to cool and solidify.

CLYDE E. WILLIAMS.
JOHN D. SULLIVAN.